(12) United States Patent
Weixler

(10) Patent No.: US 9,975,181 B2
(45) Date of Patent: May 22, 2018

(54) WORKPIECE CLAMPING DEVICE WITH FACE DRIVER

(71) Applicant: Liebherr-Verzahntechnik GmbH, Kempten/Allgaeu (DE)

(72) Inventor: Johannes Weixler, Durach (DE)

(73) Assignee: Liebherr-Verzahntechnik GmbH, Kempten/Allgaeu (DE)

( * ) Notice: Subject to any disclaimer, the term of this patent is extended or adjusted under 35 U.S.C. 154(b) by 0 days. days.

(21) Appl. No.: 15/152,476

(22) Filed: May 11, 2016

(65) Prior Publication Data
US 2016/0332235 A1 Nov. 17, 2016

(30) Foreign Application Priority Data

May 12, 2015 (DE) .................. 10 2015 005 951

(51) Int. Cl.
 *B23B 33/00* (2006.01)
 *B23B 23/00* (2006.01)
(52) U.S. Cl.
 CPC .......... *B23B 23/005* (2013.01); *B23B 33/005* (2013.01); *B23B 23/00* (2013.01); *B23B 2233/24* (2013.01); *B23B 2233/32* (2013.01)
(58) Field of Classification Search
 CPC .. B23B 23/005; B23B 33/005; B23B 2233/24
 See application file for complete search history.

(56) References Cited

U.S. PATENT DOCUMENTS

| | | | | |
|---|---|---|---|---|
| 2,194,391 A | * | 3/1940 | Ingalsbe ............... | B23B 33/005 82/165 |
| 2,377,594 A | * | 6/1945 | Weberg .................. | B23B 23/02 407/10 |
| 2,576,704 A | * | 11/1951 | Smith ................... | B23B 33/005 142/53 |
| 2,827,817 A | * | 3/1958 | Johnson ................ | B23B 33/005 142/53 |
| 2,971,413 A | * | 2/1961 | Horst .................... | B23B 33/005 82/150 |
| 3,071,996 A | * | 1/1963 | Horst .................... | B23B 33/005 82/150 |
| 3,143,907 A | * | 8/1964 | Ulrich ................... | B23B 33/005 82/165 |

(Continued)

FOREIGN PATENT DOCUMENTS

DE 1129803 B 5/1962
DE 2300671 A1 7/1974
(Continued)

*Primary Examiner* — Sara Addisu
(74) *Attorney, Agent, or Firm* — McCoy Russell LLP

(57) ABSTRACT

This present disclosure relates to a device for rotary entrainment of a workpiece clamped between two tips, which is mounted on a machine table of a machine tool, consisting of a base body with a centrically arranged tip and a plurality of concentrically arranged, axially shiftable driver elements which for the rotary entrainment of the workpiece are pressed against or into an end-face surface, wherein an axial position of the driver elements can be defined by active fixation after a centering operation of the workpiece, and to a receptacle opposite the base body, for example a tip or hollow tip, which serves a guidance of an opposite side of the workpiece.

19 Claims, 9 Drawing Sheets

(56) References Cited

U.S. PATENT DOCUMENTS

| | | | | |
|---|---|---|---|---|
| 3,266,349 A * | 8/1966 | Lane | ............ | B23B 33/005 |
| | | | | 82/165 |
| 3,311,006 A * | 3/1967 | Seitter | ............ | B23B 33/005 |
| | | | | 82/165 |
| 3,484,809 A * | 12/1969 | Swenson | ............ | B23B 33/005 |
| | | | | 82/165 |
| 3,518,904 A * | 7/1970 | Horst | ............ | B23B 33/005 |
| | | | | 82/150 |
| 4,604,923 A * | 8/1986 | Link | ............ | B23B 3/161 |
| | | | | 279/133 |
| 5,527,400 A * | 6/1996 | Smith | ............ | B23B 23/02 |
| | | | | 148/537 |
| 5,720,208 A * | 2/1998 | Siegel | ............ | B23B 33/005 |
| | | | | 82/148 |
| 6,374,713 B1 * | 4/2002 | Bissett | ............ | B23B 33/005 |
| | | | | 82/150 |
| 2015/0007701 A1 * | 1/2015 | Siegel | ............ | B23B 33/005 |
| | | | | 82/150 |
| 2015/0352643 A1 * | 12/2015 | Suzuki | ............ | B23B 33/005 |
| | | | | 82/1.11 |

FOREIGN PATENT DOCUMENTS

| | | | | |
|---|---|---|---|---|
| DE | 19534073 A1 | 3/1997 | | |
| DE | 202010009973 U1 | 9/2011 | | |
| DE | 102010060118 A1 | 4/2012 | | |
| EP | 0764490 A1 | 3/1997 | | |
| JP | 58196907 A * | 11/1983 | ............ | B23B 33/005 |
| JP | 61125703 A * | 6/1986 | ............ | B23B 33/005 |

\* cited by examiner

WORKPIECE CLAMPING DEVICE WITH FACE DRIVER

CROSS REFERENCE TO RELATED APPLICATIONS

This application claims priority to German Patent Application No. 10 2015 005 951.3, entitled "Workpiece Clamping Device with Face Driver," filed May 12, 2015, the entire contents of which is hereby incorporated by reference in its entirety for all purposes.

TECHNICAL FIELD

This present disclosure relates to a device for rotary entrainment of a workpiece clamped between two tips, which is mounted on a machine table of a machine tool, consisting of a base body with a centrically arranged tip and a plurality of concentrically arranged, axially shiftable driver elements which for the rotary entrainment of the workpiece are pressed against or into an end-face surface, wherein an axial position of the driver elements can be defined by active fixation after a centering operation of the workpiece, and to a receptacle opposite the base body, for example a tip or hollow tip, which serves a guidance of an opposite side of the workpiece.

BACKGROUND AND SUMMARY

The machine tool may be a machine for manufacturing or machining gearwheels.

Such a device frequently is referred to as face driver or end driver and may be used in undulating workpieces which have no or an insufficient workpiece bore from which the workpiece can be clamped for machining. Furthermore, such devices are used when an outer surface of the workpieces shall be machined along their entire length in one clamping position. Such devices are known from a plurality of applications, for example from DE 195 34 073 A1 or DE 10 2010 060 118 A1.

For machining the workpieces, the workpieces initially are clamped between tips, in order to ensure a workpiece concentricity, in compliance with the workpiece center. At the same time driver elements, which for applying a high torque are arranged with a rather large distance concentrically to a tip (e.g., centering tip), are pressed against a drive-side end face of the workpiece for rotary entrainment. Depending on a surface hardness of the workpiece and depending on the end-face shape and size of the driver elements, the driver elements are pressed into the surface of the workpiece to varying degrees.

A shape and size of the impression surface may be chosen such that a secure rotary entrainment of the workpiece to be machined is ensured with a chosen machining method. Furthermore, care may be taken that the workpiece is guided by the tip and not lifted off from the same by a pressing force of the driver elements, so that a precise workpiece concentricity remains ensured.

As at a time of machining the end faces of the workpieces frequently do not yet have a sufficient axial runout, but nevertheless all driver elements may uniformly be brought in engagement with the workpiece surface, the driver elements may contact the workpiece surface independent of each other and then nevertheless apply a rather uniform pressing force. In DE 20 2010 009 973 U, the pressing force for example is uniformly applied hydraulically on all driver elements. In other embodiments, driver elements resting on an oscillating ring or a gimbal-mounted disk compensate errors. In some embodiments the driver element also includes an oscillating mounted disk with a plurality of driver cutting edges.

The centering tip in the device either is mounted in an axially compliant fashion or designed stationary in a basic clamping position. As compared to an axially compliant tip, a firm assembly offers an advantage of workpiece concentricity, as bore clearance may be reduced between the tip and the basic clamping position, in order to ensure an axial shiftability (e.g., movability) thereof.

In addition, a position of the driver elements may not change during machining. In workpiece machinings in which forces with alternating directions of rotation act on the workpiece or in a case of greatly fluctuating machining forces, (for example, with interrupted cuts), the driver elements can move in their bore under an alternating load. In the case of long shafts a workpiece bend, due to the unilateral machining engagement, can lead to driver elements being loaded differently during the workpiece rotation and axially shifted thereby.

In workpiece machinings in which an exact rotary position is desired for a machining result, e.g. during tooth-machining, each change in the rotary position between device and workpiece has a negative influence on a generating coupling between tool and workpiece. Here, a very precise coupling between the rotary position of the workpiece and the rotary position of the tool increases toothing quality.

One possibility to increase toothing quality is a guidance of driver elements (which may herein be referred to as driver pins) in their bores. Care may be taken for a sufficient bore clearance, so that the axial movability of the driver pins is maintained, but at the same time the clearance may not become too large, so that a precise entrainment is achieved.

In case of very high quality requirements, this was found to be not sufficient. In DE 20 2010 009 973 U, axes of the driver elements therefore were inclined against a direction of rotation of the workpiece and hence no longer extend parallel to a workpiece axis. The workpiece in engagement with the driver pins thus generates a force directed opposite to the direction of rotation, which together with the force acting axially on the driver pins leads to the fact that in the clamped condition the driver pins are canted in the bore without clearance and thus increase rotary entrainment. Depending on the design, a partial quantity of the driver pin each can be inclined in and against the direction of rotation of the workpiece.

Nevertheless, alternating loads of an interrupted cut or machining forces acting in different directions of rotation can lead to the driver elements not remaining braced in the clamped condition. Due to alternating forces, canting can be released temporarily and thus allow small movements in radial direction and hence lead to a change in position of the workpiece with respect to the device. This is reflected in the machining result, for example as a shoulder on a tooth flank or as tooth direction error.

These loads can occur for example during gear hobbing or during gear grinding. This effect occurs on a cutting lead and on exit of the tool from toothing, when the tool cutting edges are in engagement on one flank. When helical toothings are machined, this effect becomes apparent even more distinctly due to mutual contact of the tool with left and right tooth flanks.

It therefore is the object of the present disclosure to address the issues mentioned above such that a rotary entrainment without clearance is achievable in all machining methods. In addition, secure clamping may not change during a machining process, not even when tangential machining forces fluctuate in terms of magnitude and direction.

This object is solved by a machine tool device configured to receive a workpiece between two tips, the machine tool device comprising: a plurality of driver elements arranged concentrically around a central axis of a lower tip for rotary entrainment of the workpiece, wherein each driver element of the plurality of driver elements is adjustably mounted in an axial direction of the workpiece in a lower part of the machine tool device; wherein each driver element is configured to engage with an end face of the workpiece; and wherein the plurality of driver elements is coupled to an actuator for selective engagement of the driver elements with the end face.

In the device (which may herein be referred to as a machine tool device) with face drivers according to the present disclosure, the workpiece to be clamped initially is centered on a fixed tip in the device and on an opposed tip. As compared to a movable tip, the fixed tip offers the advantage that it can be aligned very precisely on the machine table center and no bore clearance, which would be necessary for a movable tip, disadvantageously influences the workpiece concentricity. After the centering operating, the driver elements are applied to the workpiece end face.

Constructively, the driver elements for workpiece entrainment may be arranged radially with a rather large distance to the tip, so that a rather high torque can be transmitted from the device to the workpiece. Depending on the workpiece shape, individual driver elements also can be arranged with a different distance to the center. At the same time, there is a requirement for a rather lean device so as to prevent a collision of a machining head or tool with the device, especially when manufacturing helical toothings.

To compensate axial runout errors of the workpiece end face, the driver elements initially may compliantly rest against the surface and thereafter be pressed on or into the surface with approximately equal pressure. It thereby is avoided that the workpiece is tilted due to non-uniform or unilateral pressure on its end face and thus wobbles relative to the device.

In the device according to the present disclosure the driver elements therefore initially are retained mechanically when the workpiece is attached to the tip. After a precise alignment of the workpiece between the tips and an application of the centering force, which prevents shifting of the workpiece on the tip, the driver elements are released by actuating a tension bolt (e.g., drawbar), in axial direction of the device, and thus can rest against the workpiece end face or press into the workpiece with an adjustable force. When the tension bolt in addition is actuated further in axial direction, the driver elements are actively clamped in their end position via additional clamping elements and thus fixed in their position without clearance during machining of the workpiece.

This clamping process on one hand ensures a good workpiece concentricity and the workpiece is also securely guided between tips with alternating machining forces. The torque for machining is applied and maintained and the precise rotary transmission is ensured.

In a further embodiment it is conceivable that the upper tip is formed as hollow tip or steady rest. Alternatively or in addition a design of the lower tip as hollow tip is conceivable. The guiding element ensures a concentricity of the workpiece.

In an alternative embodiment, the tip in the basic clamping position can be mounted compliant in axial direction. By adjusting spring force and axial paths between the tip and the driver elements, a similar clamping process can be achieved. Springs and axial paths may be adjusted to each other such that the centering operation first is completed, before the driver pins are brought in engagement with the workpiece end face. In this embodiment, the bore for guiding the tip has a small clearance. Therefore, this embodiment chiefly is used when the workpiece shape does not provide the use of the embodiment.

In another embodiment, the contact surfaces of the driver elements additionally are equipped with replaceable attachments. Thus, adaptations to the material properties of the workpiece to be machined, the shape and size of the admissible impressions at the workpiece, the treatment condition of the workpiece material, but also to the machining method can be carried out quite easily. For example, a supporting surface for a gear milling process and a support for a hard finishing process may be designed differently for a single workpiece. On the one hand, processes differ by the occurring machining forces, and on the other hand a hardened edge layer constitutes an obstacle against a penetration of supporting points. In this case, a frictional entrainment by the driver elements is desirable.

Furthermore, the driver elements can be provided with different attachments on upper end faces. The device thereby can be adapted quite easily to different workpieces, and in a case of wear attachments can be exchanged without problems. It can be advantageous to fall back on commercially available attachments, such as indexable inserts.

Due to possibility for adjustment of the spring force of the driver elements, the force can correspondingly be adjusted in compliance with properties of contact surfaces (frictional contact, penetration depth, etc.). By means of a variable tensile force, height of the active clamping force for the driver elements can be influenced in addition. At a reduced clamping force, instead of an active fixation of the driver pins, the driver pins could also work with a damping effect.

It can furthermore be provided that the upper and/or lower tip for receiving the workpiece likewise can be designed as change part, in order to adapt the tips to differently large workpiece bores and workpiece dimensions and to likewise exchange the tips easily and at low cost in a case of wear.

An extended embodiment can be used for workpiece loading in case of manual loading, without use of an automation equipment.

Manual loading requires a centric attachment of the workpiece to the device, in order to prevent tilting of the workpiece. Possible falling of the workpiece during loading and a possible hazard to the machine operator thereby shall be prevented. Loading of machines for example with long shafts frequently is realized in a hanging manner with a loading device, optionally an eye bolt which is screwed into an upper central bore of the workpiece. Such a device subsequently may be removed, however, before the upper tip or the upper guiding element can move onto the upper side of the workpiece. During manual loading, the device therefore may include a suitable means for holding the workpiece.

During automatic loading, the loading device prevents tilting of the workpiece.

In an extended embodiment, tilt protection is realized via coaxially arranged supporting bolts/receiving elements, on which the workpiece can be placed during loading. The same however are retracted from the workpiece end face for subsequent machining of the workpiece, in order to prevent a negative influence on quality of concentricity/axial runout of the workpiece.

Further advantages and properties of the present disclosure will be explained in detail below with reference to several drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 1-7C are shown to scale, although other relative dimensions may be used.

DETAILED DESCRIPTION

The following description relates to systems and methods for a device for rotary entrainment of a workpiece clamped between two tips, with the device mounted on a machine table of a machine tool.

Figure 1:
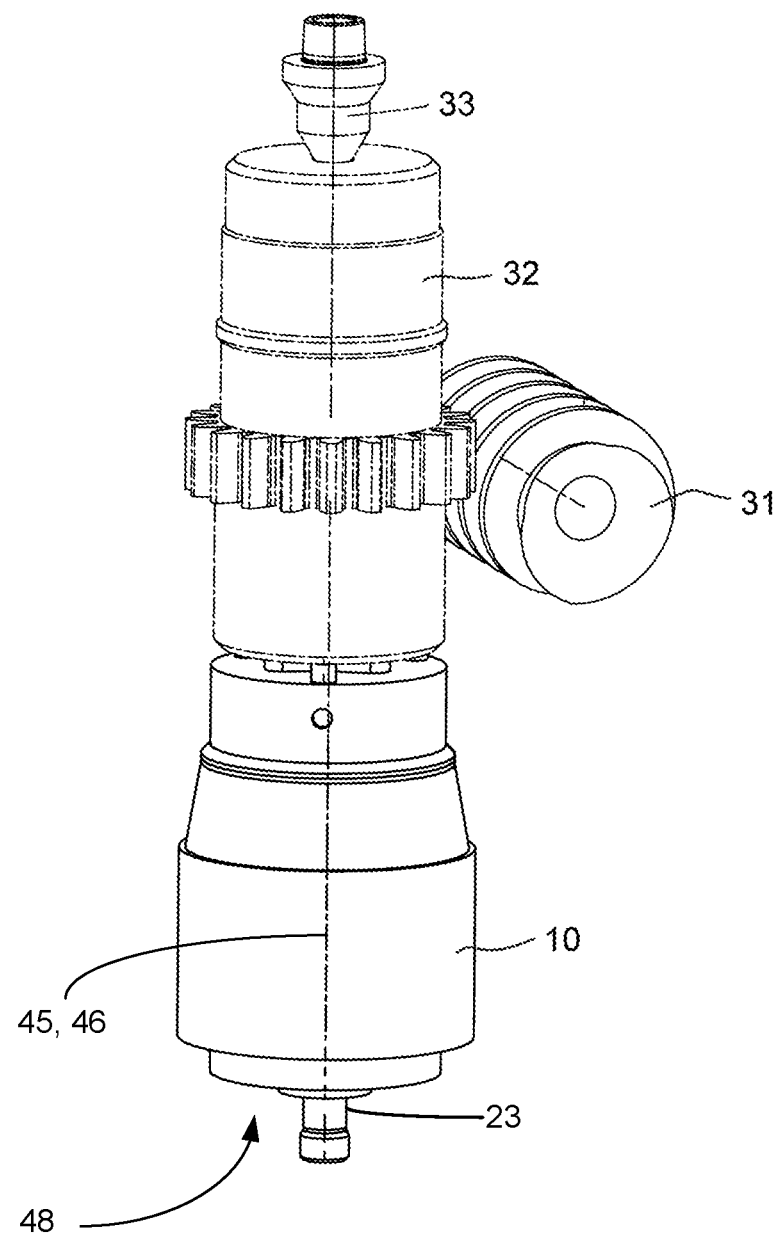
FIG. 1 shows a side view of a device according to the present disclosure with a machining tool in engagement.

FIG. 1 shows a side view of a device (e.g., machine tool device) 10 with a workpiece 32 which is clamped between an upper tip 33 and a lower tip 23 within the device 10. The workpiece includes an end face 48. This workpiece 32 is machined in its toothing with a machining tool 31, in this case a grinding worm. For this purpose, the tool 31 in one or more cycles moves parallel to an axial direction 46 of the workpiece 32 with different center distances and thus generates or machines the toothing. A central axis 45 of the lower tip 23 is shown. In one example, the axial direction 46 of the workpiece 32 may align with the central axis 45.

For machining purposes, the workpiece is loaded onto the device 10 with a loading system (not shown) or manually and by lowering the upper tip 33 the workpiece 32 is clamped on the device between this tip and the lower tip 23. In another axial arrangement, the entire device 10 for example might also be arranged horizontally.

The workpiece 32 initially is centered between tips 23, 33, before driver elements 25 included within a lower part 47 (shown by FIGS. 2-7) are actively applied in a further process. Thus, an increased concentricity of the workpiece 32 is achieved before a secure rotary entrainment is achieved by pressing the driver elements 25 against the workpiece 32.

Figure 2:
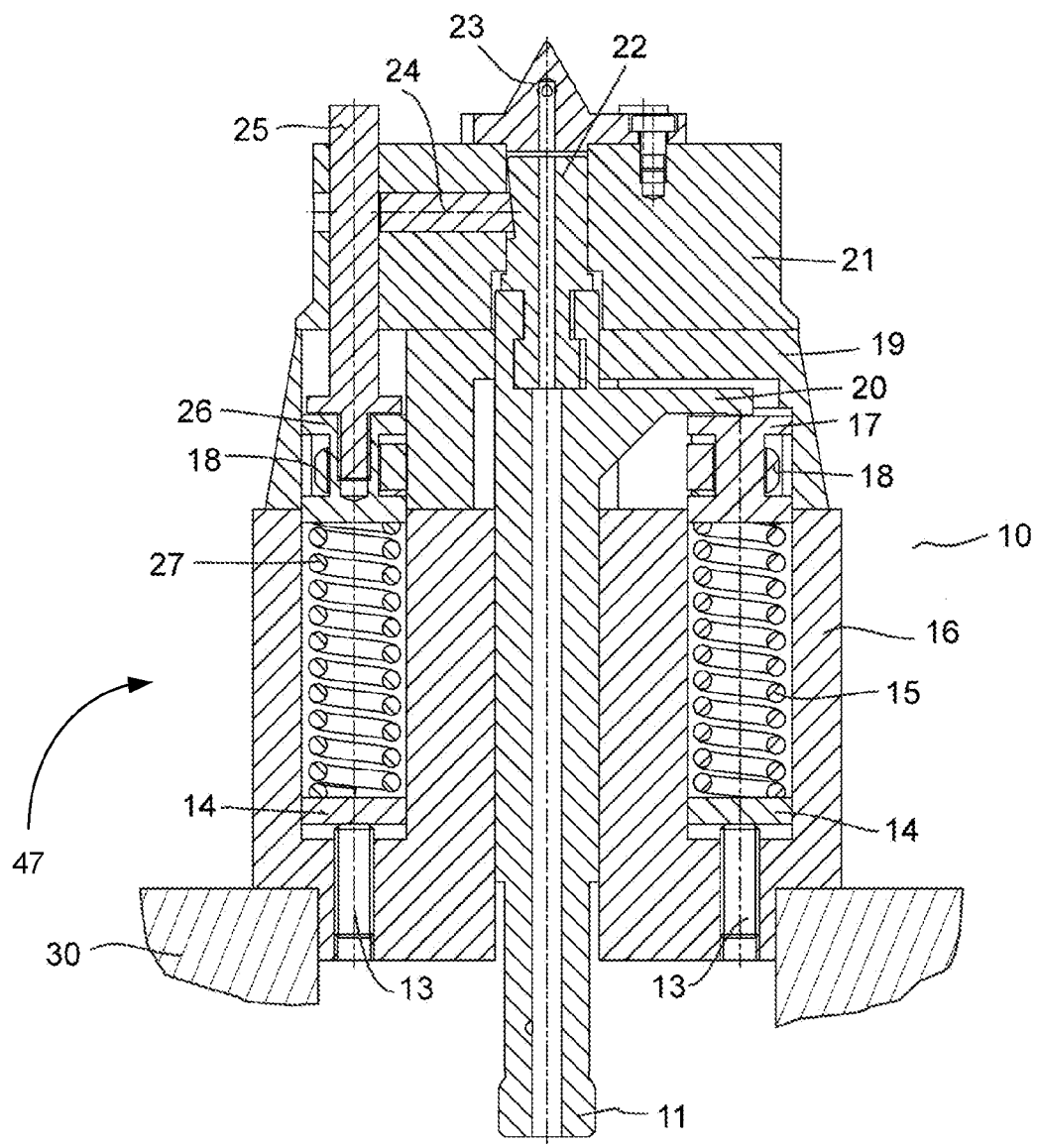
FIG. 2 shows a sectional view through a device according to the present disclosure.

In a sectional view of the device 10 as shown in FIG. 2, details of the device 10 according to the present disclosure are illustrated. The device 10 is mounted on a machine table 30 which transmits rotary movement to the device 10 and hence to the workpiece 32 (shown by FIG. 1 and FIGS. 6-7). In this case, a three-part structure of the device 10, consisting of the clamping base 16 for mounting the device 10 on the machine table, attachment 19 and upper part 21 of the device with replaceable lower tip 23 is shown in a sectional view.

In the clamping base 16 receiving bores are provided, which receive springs 15, 27. Springs 15 and 27 may each have a different spring constant (e.g., each spring may stretch or compress by a differing amount when an approximately similar force is applied). A pressing force 49 of each driver element 25 against the end face 48 via the differently strong springs 15, 27 can be influenced via adjusting elements 13 (which may herein be referred to as threaded pins or threaded bolts). A restoring force against each driver element 25 in a direction away from the end face 48 via the springs 15 and 27 is indicated by arrow 50. When identically constructed springs 15, 27 are used, the springs may be pre-tensioned differently, in order to ensure a correct clamping process. By shifting the adjusting elements 13, the adjusting elements 13 delimit installation space of the springs 15, 27 via pressing plates 14 and thus can modify the pressing force of the springs 15, 27. The springs 15, 27 in turn act either on the driver element 25 or on one of arms 20 at tension bolt 11 (which may herein be referred to as drawbar 11) via drivers 17, 26. Two of the drivers 17 and 26 each are connected via a lever 18 mounted in the attachment 19.

The tension bolt 11 acts on an actuating bolt 22 which via oblique surfaces and clamping elements 24 fixes the driver elements 25 in their position.

Figure 3:
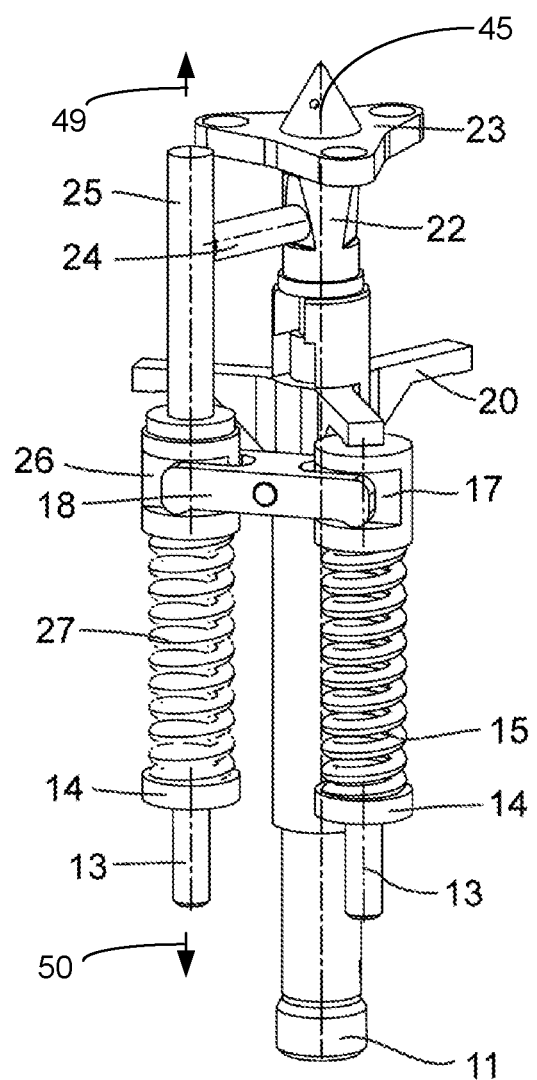
FIG. 3 shows a detail view of an actuating device for driver elements.
Figure 4:
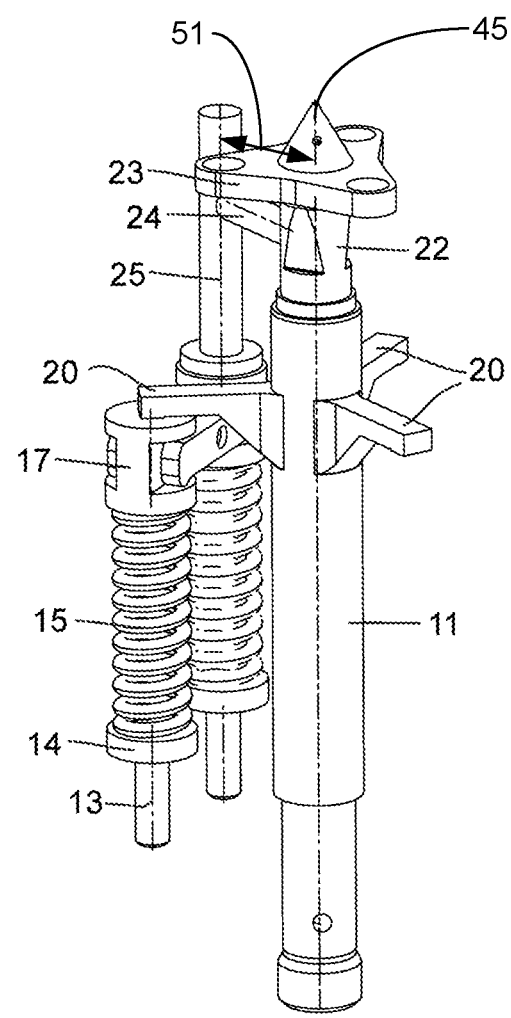
FIG. 4 shows a further detail view of the actuating means for the driver elements.
Figure 5:
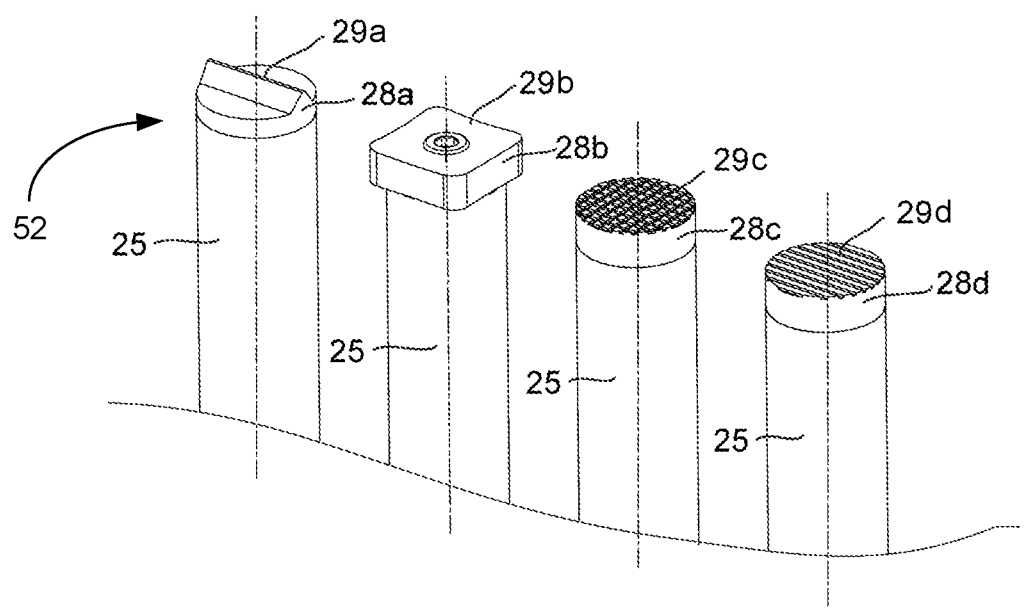
FIG. 5 shows a detail view with several variants for replaceable attachments for the driver elements.

With reference to detail views shown by FIGS. 3-4, a mode of operation of the device 10 (shown by FIG. 2) now can be explained. In a clamping process, the workpiece 32 initially is received between tip 23 and opposed tip 33 (shown by FIG. 1) and thereby aligned in its concentricity. A displacement of driver element 25 from the central axis 45 of the lower tip 23 is indicated by arrow 51.

For applying the driver elements 25 to a lower workpiece end face, the tension bolt 11 now is pulled downwards by an external means. The arms 20 at the tension bolt 11 likewise press the spring-loaded drivers 17 downwards. Via levers 18, the drivers 26 now are actuated and thus move the driver elements 25 upwards, whereby the same attach to the end face of the workpiece 32 or with a corresponding spring force press into a surface of the workpiece 32. The spring force of the spring 27 may be dimensioned and adjusted corresponding to a desired penetration depth and surface pressure therefor. By means of drawbar 11, the clamping elements 24 at the same time also are moved in direction of the driver elements 25 and clamp the same in their position. Three arms 20 each are shown in FIGS. 3-4, but for reasons of clarity representation of the springs 15, 27, drivers 17, 26, levers 18 and driver elements 25 etc. below two of arm 20 were omitted.

As certain processes may be triggered one after the other via respective position of the drawbar, its path and a time at which the driver elements 25 rest against the workpiece 32 may be adjusted to a position at which the drivers 17, 26 are clamped. For this purpose, the driver elements 25 can be varied in their position relative to the drivers 26. For this case, threads in this example are provided in the drivers 26 for fine adjustment.

Adaptation however can also be effected via attachments at upper end faces 52 of the driver elements 25. Exemplary embodiments will be shown with reference to the examples in FIG. 5. Beside length adaptation, these attachments 28a, 28b, 28c, and 28d also offer a possibility for mounting different supporting surfaces 29a, 29b, 29c, and 29d (respectively) for the workpiece contact surface. Depending on tensile strength of the workpiece material and depending on a maximum impression depth admissible at the workpiece 32, this can be influenced via size and shape of the supporting surface. The size of the supporting surfaces determines the surface pressure, and by adjusting geometries such as grooves, points, cutting edges, rhombuses or checkered patterns in the supporting surfaces, an impression in the workpiece can be adapted.

In hardened workpieces 32, for example, attachments with end faces coated with hard material (e.g. with diamond or CBN) also can transmit entrainment force.

By a corresponding design of the attachments, receptacles for use of commercially available purchased parts also can be provided. For example, an indexable insert with suitable surface shape, shown by way of example for a square plate 28b. These replaceable elements (alienated) hence can be used here in a simple and inexpensive way.

Of course, however, the end faces of the driver elements 25 also can directly be designed correspondingly, without attachments being required.

Figure 6:
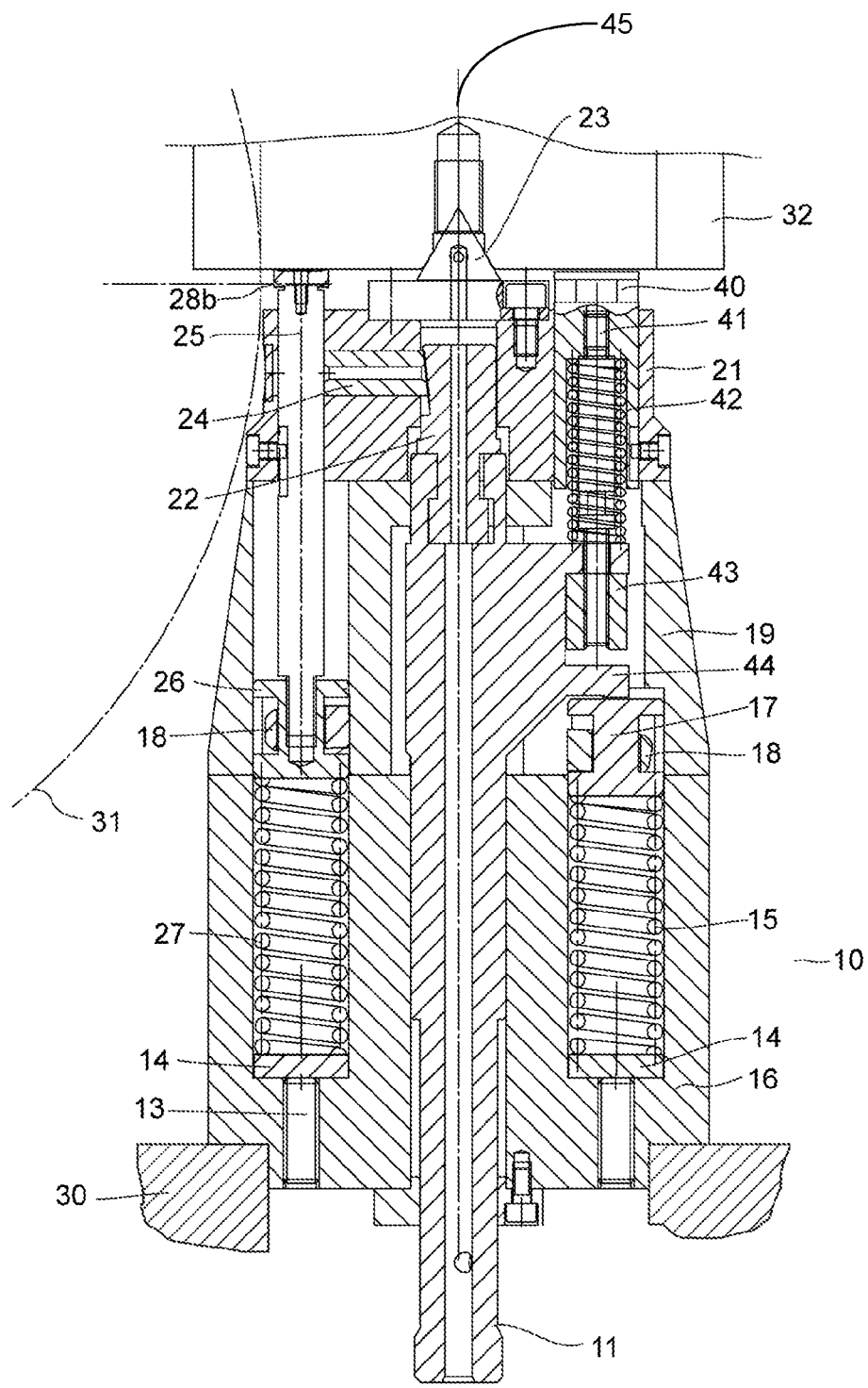
FIG. 6 shows a sectional view of a device according to the present disclosure in an extended embodiment.

FIG. 6 shows a sectional view of a device according to the present disclosure in an extended embodiment, which can be used without employing an automation equipment during manual workpiece loading. Advantageously, this device comprises supporting bolts 40 arranged concentrically around the tip 23, to which the workpiece 32 can initially be attached approximately centrally during manual loading. Towards a top, a path of movement for the supporting bolts 40 is delimited by threaded bolts 41 which are screwed in between the supporting bolts 40 and the arms 44 at the tension bolt 11. The springs 42 are designed corresponding to the workpiece weight.

Figure 7A:
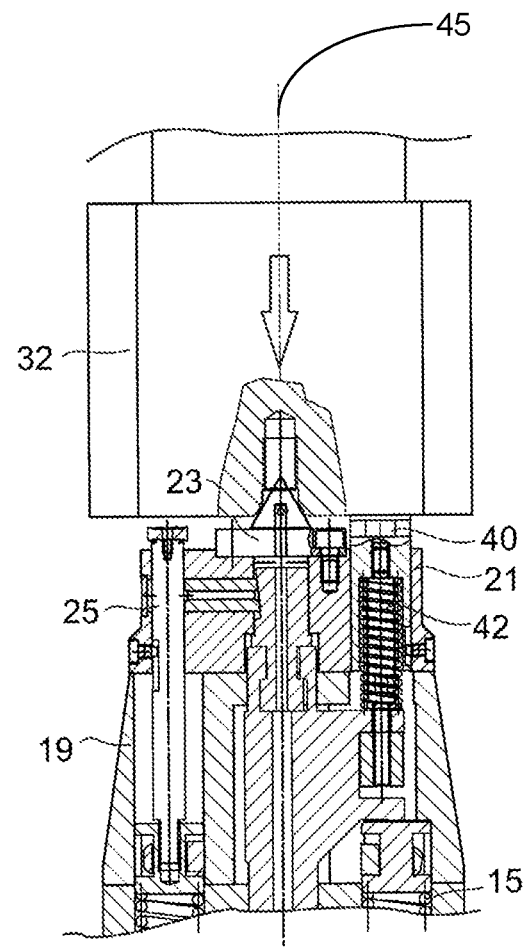
FIG. 7A shows a first detail view for illustrating a clamping process in a device according to the present disclosure in the extended embodiment.
Figure 7B:
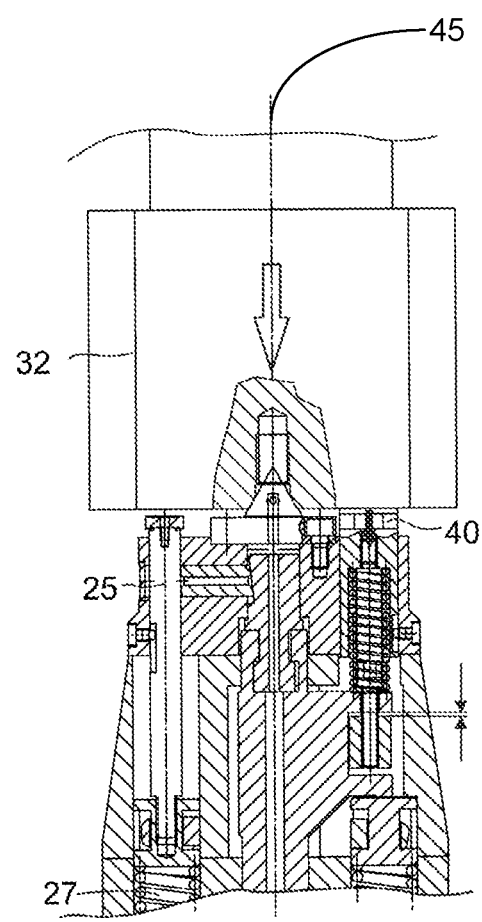
FIG. 7B shows a second detail view for illustrating a clamping process in a device according to the disclosure in the extended embodiment.
Figure 7C:
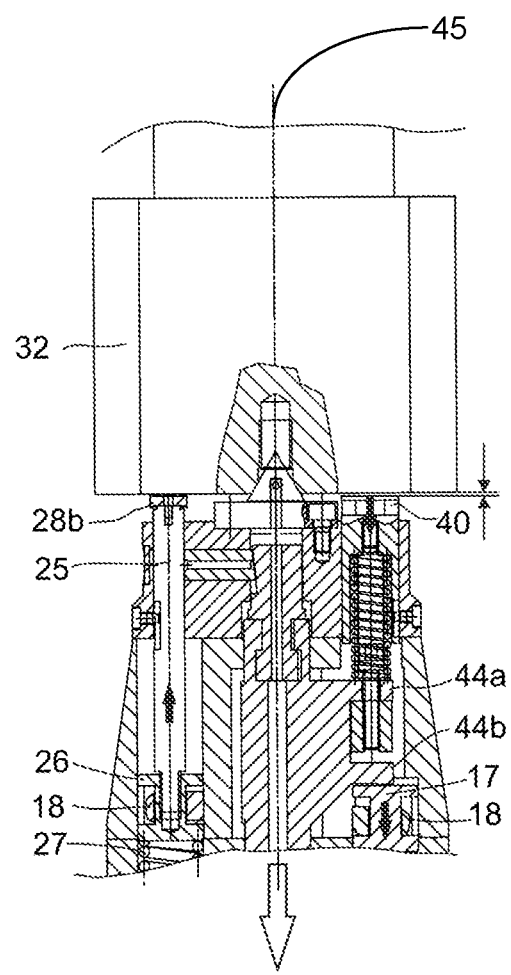
FIG. 7C shows a third detail view for illustrating a clamping process in a device according to the disclosure in the extended embodiment.

The detail views of FIGS. 7A, 7B, and 7C show the further clamping process in the extended embodiment.

The lower tip 23 arranged centrally in the device initially effects pre-centering of the workpiece 32 on attachment of the workpiece, in that the workpiece is attached to the lower tip 23 with its center. When the workpiece 32 is deposited, the supporting bolts 40 now are compressed under the workpiece weight via the compression spring 42, until the workpiece 32 sits on the lower tip 23 exactly centrally (see also FIG. 7B), wherein it is also supported by the supporting bolts 40. When the upper tip or the upper guiding element (such as upper tip 33 shown by FIG. 1) now have taken over the guidance of the workpiece and tilting of the workpiece 32 can be prevented, the supporting bolts 40 can be retracted from the workpiece 32 and the driver elements 25 and possibly the attachments 28a, 28b, 28c, or 28d can be pressed against the workpiece end face with their supporting surface 29a, 29b, 29c, or 29d (respectively). For this purpose, the tension bolt 11 is pulled downwards via an external means, e.g. a hydraulic cylinder (not shown). Via arms 44a the threaded pins 41 and hence the supporting bolts 40 now are retracted from the workpiece end face and at the same time the drivers 17 are moved downwards via arms 44b. This in turn leads to the fact that via the levers 18 and the drivers 17 the driver elements 25 are pressed against the workpiece end face. As soon as a sufficient pressing force exists, the driver elements 25 are clamped correspondingly, as described already.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one embodiment, a machine tool device configured to receive a workpiece between two tips includes: a plurality of driver elements arranged concentrically around a central axis of a lower tip for rotary entrainment of the workpiece, wherein each driver element of the plurality of driver elements is adjustably mounted in an axial direction of the workpiece in a lower part of the machine tool device; wherein each driver element is configured to engage with an end face of the workpiece; and wherein the plurality of driver elements is coupled to an actuator for selective engagement of the driver elements with the end face. In a first example of the machine tool device, the actuator is a tension bolt arranged in an axial direction of the machine tool device. A second example of the machine tool device optionally includes the first example and further includes wherein the driver elements are coupled to clamping elements, and the clamping elements are configured to retain the driver elements in engagement with the end face. A third example of the machine tool device optionally includes one or both of the first or second examples, and further includes wherein a pressing force of each driver element against the end face is proportional to a spring constant of a spring coupled to the driver element. A fourth example of the machine tool device optionally includes one or more or each of the first through third examples, and further includes wherein a restoring force against each driver element in a direction away from the end face is proportional to a spring constant of a spring coupled to the driver element. A fifth example of the machine tool device optionally includes one or more or each of the first through fourth examples, and further includes wherein one or more driver element of the plurality of driver elements is arranged with a different displacement from the central axis of the lower tip. A sixth example of the machine tool device optionally includes one or more or each of the first through third examples, and further includes wherein each driver element includes a supporting surface on a driver element end face. A seventh example of the machine tool device optionally includes one or more or each of the first through third examples, and further includes wherein a size and shape of each supporting surface is configured to reduce an impression on the workpiece. An eighth example of the machine tool device optionally includes one or more or each of the first through seventh examples, and further includes wherein one or more of the supporting surfaces has a different size and shape from other supporting surfaces. A ninth example of the machine tool device optionally includes one or more or each of the first through eighth examples, and further includes wherein one or more driver elements include a replaceable attachment coupled to an end face of the one or more driver elements. A tenth example of the machine tool device optionally includes one or more or each of the first through ninth examples, and further includes wherein a position of the lower tip along the central axis of the lower tip is not adjustable. An eleventh example of the machine tool device optionally includes one or more or each of the first through tenth examples, and further includes wherein a position of the lower tip along the central axis of the lower tip is adjustable. A twelfth example of the machine tool device optionally includes one or more or each of the first through eleventh examples, and further includes wherein one or more of an upper tip or the lower tip is a hollow tip. A thirteenth example of the machine tool device optionally includes one or more or each of the first through twelfth examples, and further includes wherein the lower tip is replaceable.

In another embodiment of a machine tool device configured to receive a workpiece between two tips, the machine tool device includes: a plurality of compliantly mounted supporting bolts for supporting the workpiece; and a plurality of driver elements arranged concentrically around a centering tip for rotary entrainment of the workpiece, wherein: each driver element of the plurality of driver elements is adjustably mounted in an axial direction of the workpiece in a lower part of the machine tool device; each driver element is configured to engage with an end face of the workpiece; the plurality of driver elements is coupled to an actuator for selective engagement with the end face; the actuator is a tension bolt arranged in an axial direction of the device; wherein the driver elements are coupled to clamping elements; and the clamping elements are configured to retain the driver elements in engagement with the end face. In a first example of the machine tool device, each supporting bolt of the plurality of supporting bolts is adjustably retractable. A second example of the machine tool device optionally includes the first example, and further includes wherein the supporting bolts are coupled to the tension bolt. A third example of the machine tool device optionally includes one or both of the first and second examples, and further includes wherein the tension bolt is configured to adjustably retract the supporting bolts. A method for a clamping a workpiece with a device includes centering the workpiece between two tips of the device along a direction perpendicular to a central axis of the workpiece, engaging driver pins of the device with an end face of the workpiece by actuation of a tension bolt, and retaining the driver pins in engagement with the end face by actuation of clamping elements coupled to the driver pins. In a first example of the method, the workpiece is supported by a plurality of resiliently mounted receiving bolts during centering of the workpiece, and wherein actuation of the tension bolt retracts the receiving bolts.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A machine tool device configured to receive a workpiece between two tips, the machine tool device comprising:
a plurality of driver elements arranged radially around a central axis of a lower tip for rotary entrainment of the workpiece, wherein each driver element of the plurality of driver elements is adjustably mounted in an axial direction of the workpiece in a lower part of the machine tool device;
wherein each driver element is configured to engage with an end face of the workpiece;
wherein the plurality of driver elements is coupled to an actuator for selective engagement of the driver elements with the end face, wherein the actuator is a tension bolt arranged in an axial direction of the machine tool device; and
wherein each driver element of the plurality of driver elements is further adjustable via an adjusting element.

2. The machine tool device of claim 1, wherein the driver elements are coupled to clamping elements, and the clamping elements are configured to retain the driver elements in engagement with the end face.

3. The machine tool device of claim 1, wherein a pressing force of each driver element against the end face is proportional to a spring constant of a spring coupled to the driver element.

4. The machine tool device of claim 1, wherein a restoring force against each driver element in a direction away from the end face is proportional to a spring constant of a spring coupled to the driver element.

5. The machine tool device of claim 1, wherein at least one driver element of the plurality of driver elements is arranged with a different radial distance from the central axis of the lower tip than at least one second driver element of the plurality of driver elements.

6. The machine tool device of claim 1, wherein each driver element includes a supporting surface on a driver element end face.

7. The machine tool device of claim 6, wherein a size and shape of each supporting surface is configured to reduce an impression on the workpiece.

8. The machine tool device of claim 7, wherein one or more of the supporting surfaces has a different size and shape from other supporting surfaces.

9. The machine tool device of claim 1, wherein one or more driver elements include a replaceable attachment coupled to an end face of the one or more driver elements.

10. The machine tool device of claim 1, wherein a position of the lower tip along the central axis of the lower tip is not adjustable.

11. The machine tool device of claim 1, wherein a position of the lower tip along the central axis of the lower tip is adjustable.

12. The machine tool device of claim 1, wherein one or more of an upper tip or the lower tip is a hollow tip.

13. The machine tool device of claim 1, wherein the lower tip is replaceable.

14. A machine tool device configured to receive a workpiece between two tips, the machine tool device comprising:
   a plurality of compliantly mounted supporting bolts for supporting the workpiece; and
   a plurality of driver elements arranged radially around a centering tip for rotary entrainment of the workpiece, wherein: each driver element of the plurality of driver elements is adjustably mounted in an axial direction of the workpiece in a lower part of the machine tool device; each driver element of the plurality of driver elements is further adjustable via an adjusting element; each driver element is configured to engage with an end face of the workpiece; the plurality of driver elements is coupled to an actuator for selective engagement with the end face; and the actuator is a tension bolt arranged in an axial direction of the machine tool device;
   wherein the supporting bolts are coupled to the tension bolt;
   wherein the driver elements are coupled to clamping elements; and
   wherein the clamping elements are configured to retain the driver elements in engagement with the end face.

15. The machine tool device of claim 14, wherein each supporting bolt of the plurality of supporting bolts is adjustably retractable.

16. The machine tool device of claim 14, wherein the tension bolt is configured to adjustably retract the supporting bolts.

17. A method for clamping a workpiece with a device, comprising centering the workpiece between two tips along a direction perpendicular to a central axis of the workpiece, engaging driver pins of the device with an end face of the workpiece by actuation of a tension bolt, and subsequently retaining the driver pins in engagement with the end face by actuation of clamping elements coupled to the driver pins;
   wherein each driver pin is further adjustable via an adjusting element.

18. The method of claim 17, wherein the workpiece is supported by a plurality of resiliently mounted supporting bolts during centering of the workpiece, and wherein actuation of the tension bolt retracts the supporting bolts.

19. A method for clamping a workpiece with a device, comprising centering the workpiece between two tips along a direction perpendicular to a central axis of the workpiece, engaging driver pins of the device with an end face of the workpiece by actuation of a tension bolt, and subsequently retaining the driver pins in engagement with the end face by actuation of clamping elements coupled to the driver pins;
   wherein the workpiece is supported by a plurality of resiliently mounted supporting bolts during centering of the workpiece, and wherein actuation of the tension bolt retracts the supporting bolts.

* * * * *